United States Patent Office 2,706,812
Patented Apr. 19, 1955

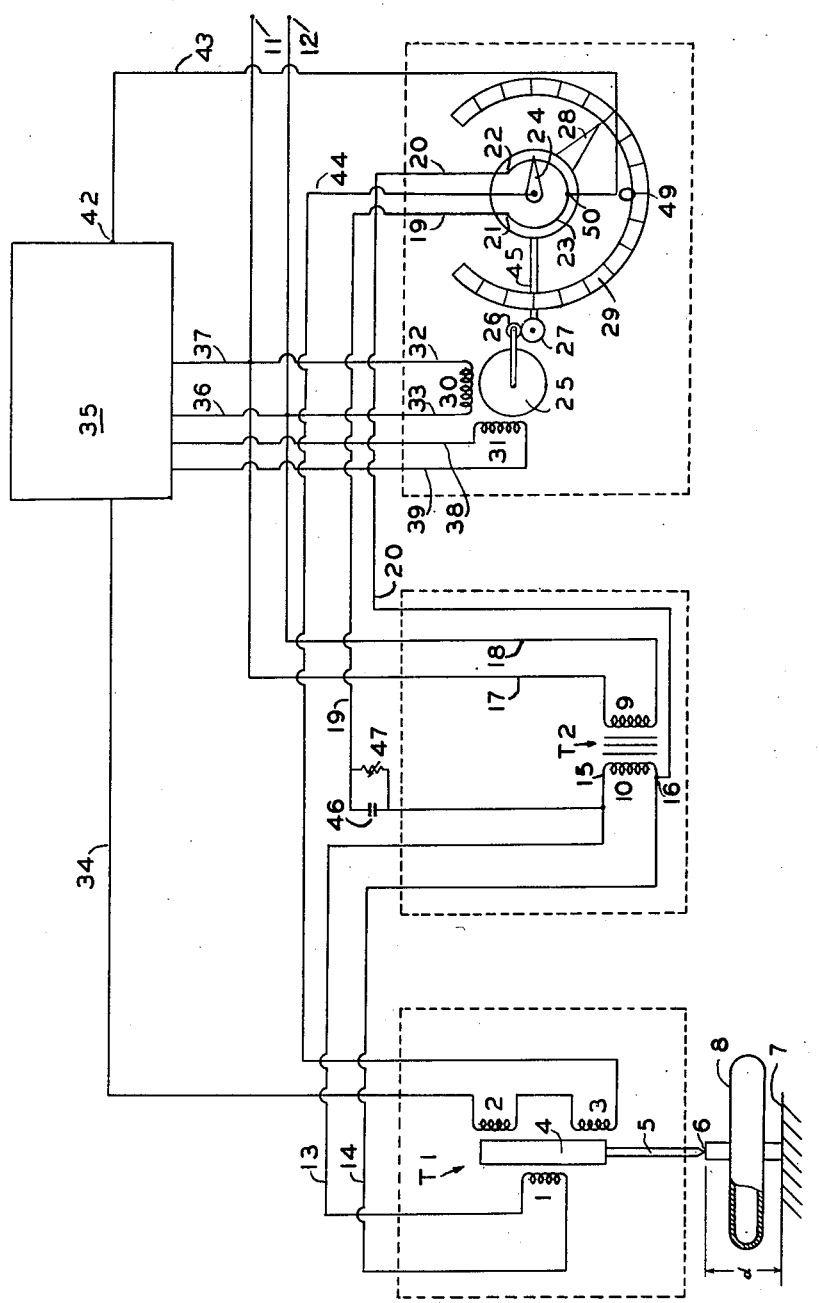

2,706,812

NULL BALANCE CONTROL SYSTEMS

Robert Irwin Dinlocker, Lansdale, Pa., assignor to American Machine and Metals, Inc., New York, N. Y., a corporation of Delaware Application October 20, 1951, Serial No. 252,217

1 Claim. (Cl. 340—187)

This invention relates to an electrically controlled device for indicating the position of a point of a physical object in comparison with a standard position.

It is an object of this invention to construct a device of this kind in such a manner that it will indicate any difference in the position of the point under test from the standard position at a greatly magnified scale.

A further object of the invention is to provide a device for indicating the position of a point of a physical object which has means for comparing two voltages of which the first is set up in consequence of, and in proportion to any difference from the standard position that might exist in the position of the point under test, and of which the second is set up in a variable impedance by moving a tapping or contact member over it until the second voltage becomes equal and opposite to the first, the distance of the position of the tap point at which balance of said two voltages is established from a fixed zero position being a measure for the distance by which the point of the physical object under test differs from the standard position.

A further object of the invention is to provide a device of the kind referred to wherein the means for moving the tapping member over the variable impedance is operative in response to the instantaneous algebraic sum of the two above mentioned voltages.

A further object of the invention is to provide a device of the kind referred to wherein the one of the two voltages to be compared is set up by means of a differential transformer having a primary coil, oppositely wound secondary coils arranged symmetrically with respect to said primary coil and an armature which is axially movable relative to said coils in accordance with changes in the position of the point under test of the physical object. The differential transformer is preferably of a kind in which a minute movement of the movable structure is transformed into a high output voltage of the transformer proper.

Another object of the invention resides in the provision of a device of the kind referred to wherein for moving the tapping member over the variable impedance with which it cooperates a motor is provided whose revolving part is controlled as to speed by the magnitude of the algebraic sum of the two voltages existing at any moment and as to direction of travel by the polarity of said algebraic sum.

Still a further object of the invention is to provide a device of the kind referred to wherein the position of the point of the physical object to be tested is detected by means which will not exert pressure upon this point. Thereby the device can be used with advantage for indicating the height or thickness of thin-walled hollow bodies, such as aneroid capsules, and for measuring the changes in the height or thickness of such aneroid capsules under the influence of temperature changes.

Other objects of the invention will appear as the description proceeds, reference being had to the accompanying drawing which illustrates by way of a circuit diagram one form of a device embodying the invention.

In the drawing a differential transformer $T_1$ is shown having a primary coil 1, two secondary coils 2 and 3 connected in series, and an axially movable armature 4. Rigidly attached to the armature 4 is a detector element or feeler 5. The two secondary coils 2, 3 are arranged symmetrically with respect to the primary coil 1 and are of identical construction except that they are oppositely wound so that the voltages therein will buck each other.

As is well known, the output voltage of such a differential transformer depends on the position of the movable armature 4. When this armature is exactly midways between the two secondary coils 2 and 3, voltages of identical magnitude are set up in both said coils 2 and 3 and, since these coils are oppositely wound, these two equal voltages balance each other so that the output voltage of the differential transformer $T_1$ is zero. If the armature 4 is in a position in which it overlaps more of the coil 2 than of the coil 3, the voltage set up in the coil 2 is larger than that in the coil 3. The output voltage of the differential transformer is then equal to the difference of the two voltages in the two secondary coils 2 and 3 and is of a polarity equal to that of the voltage in the coil 2. Conversely, if the armature 4 moves from its balanced position downwardly, so as to overlap more of the coil 3 than of the coil 2, the voltage in the coil 3 predominates and the output voltage of the transformer $T_1$, which again is equal to the difference of the two voltages in the two secondary coils 2 and 3, is of the polarity of the voltage in the coil 3.

The length of the feeler rod 5 is chosen so that the armature 4 is in its balanced position between the secondary coils 2 and 3 of $T_1$ when the front end 6 of the rod 5 has that distance $d$ from a surface 7 which is chosen as the standard distance, such as the standard height of a physical object 8. This object 8 will ordinarily be one of a series of similar objects to be tested and in the drawing this object 8 is indicated to be a hollow aneroid capsule. If the height of the object under test happens to be equal to the standard distance $d$, then the armature 4 is in balanced position causing in the above described manner an output voltage of the differential transformer $T_1$ of zero. If, however, the height of the object 8 is larger or smaller than the standard value $d$, then the feeler rod 5 will be, respectively, in an elevated or lowered position as compared with the balanced position and in consequence of the similarly elevated or lowered position of the armature 4 the output voltage of the differential transformer $T_1$ will differ from zero by an amount proportional to the amount by which the height of the object 8 is larger or smaller than the distance $d$.

In order to obtain a high output voltage from the differential transformer $T_1$ in response to extremely minute displacements of the armature 4, such as displacements of one thousandth of an inch or even less, that known type of differential transformer may be used wherein each of the two secondary coils is wound of a plurality of adjacently laid strands, the end of the first strand being connected to the beginning of the second strand, the end of the second strand to the beginning of the third strand, etc. This type of differential transformer is described, for instance, in U. S. Patent No. 2,461,238 of Herman Schaevitz.

The two ends of the primary coil 1 of the differential transformer $T_1$ are connected by means of leads 13 and 14, respectively, to the end points 15 and 16 of the secondary coil 10 of a transformer $T_2$ whose primary coil 9 is connected by means of leads 17 and 18 to terminals 11 and 12, respectively, of a source of alternating current. This source may be an ordinary 110 volt 60 cycle single phase current line. In parallel to the primary coil 1 of the differential transformer $T_1$ there is connected with the secondary winding 10 of the transformer $T_2$ a variable impedance 23. The one end 21 of the impedance 23 is connected by a lead 19 to the upper end 15 of the winding 10, whereas the other end 22 is connected to the lower end 16 of the winding 10 by means of a lead 20. In the example shown in the drawing the variable impedance 23 is formed by a substantially circular resistance element with which a tapping member in the form of a contact arm 24 mounted on a shaft 45 cooperates to form a potentiometer. The contact arm 24 is movable over the resistance element 23 by a motor 25 whose shaft is mechanically connected with the shaft 45 by any suitable gearing, e. g. the two gear wheels 26 and 27 indicated in the drawing. Connected with the contact arm 24 for rotational movement therewith is a pointer or indicator 28 movable over a scale 29 which extends in both directions from its zero mark indicated at 49.

The motor 25 is a reversible motor and comprises in addition to a winding 30 connected through leads 32 and 33 to the line terminals 11 and 12, a winding 31 which is connected into the output circuit 38, 39 of an electronic amplifier 35 whose input end is connected by means of a lead 34 to the output end of the secondary coil 2 of the differential transformer $T_1$. The amplifier 35 may be of any conventional type having any desired number of amplifier stages and since the construction of this amplifier does not form part of the present invention, the amplifier is not shown in detail but indicated schematically only by a rectangle. The amplifier 35 is supplied with power from the source of alternating current 11, 12 through leads 36 and 37. 42 denotes a point of the amplifier 35, preferably of constant potential, connected by means of a lead 43 to the center point 50 of the resistance element 23. 44 denotes a lead connecting the lower end of the secondary coil 3 of the differential transformer $T_1$ with the pivotal end 45 of the movable contact arm 24.

The arrangement as described thus far provides for a testing circuit extending from the lower end of the secondary coil 3 of the differential transformer $T_1$ across both secondary coils 2 and 3, through the lead 34 to the input of the amplifier 35, further through this amplifier to the point 42 thereof, then through the lead 43 to the center point 50 of the variable impedance (resistor) 23, through such part of this variable impedance as extends from the just mentioned center point 50 thereof to the contact point of the contact arm 24 with said impedance, through the arm 24 to the pivotal end 45 of the latter and thence through the lead 44 back to the lower end of the secondary coil 3 of the differential transformer $T_1$.

The just described testing circuit has the purpose of comparing the voltage resulting in the secondary coils 2, 3 of the transformer $T_1$ with the voltage set up between the point 50 of the resistance element and the point of contact of the arm 24 with this resistance element. Where, as in the example shown, there are to be compared in the testing circuit a voltage resulting in the secondary coils 2 and 3 representing substantially inductive reactance with a voltage set up in an element representing substantially ohmic resistance, means have to be provided to compensate for the phase angle difference existing between inductance and resistance. In the example shown such phase angle correction is brought about by a condenser 46 shunted by a variable resistor 47 and inserted into the lead 19 connecting the right hand end 21 of the resistance element 23 with the end 15 of the secondary coil 10 of the transformer $T_2$. By means of this phase angle correcting device 46, 47 the voltage developed in the series of induction coils 2 and 3 of the differential transformer $T_1$ can be brought into phase with the voltage developed along the resistance element 23 so that these two voltages can add to each other algebraically in the testing circuit and, in particular, balance each other.

The pointer 28 indicates zero on the scale 29 when the armature 4 is positioned exactly midways between the two secondary coils 2, 3 of the differential transformer $T_1$ and no unbalancing voltage is set up in the variable resistance 23, the contact arm 24 being in contact with the center point 50 of the resistance 23. The amplifier 35 then receives no input voltage and the motor coil 31 in the output circuit 38, 39 of the amplifier 35 is de-energized. In any position of the armature 4 above or below the balanced position, the output voltage produced in the bucking secondaries 2 and 3 of the differential transformer $T_1$ is out of balance with the zero voltage existing in the resistance element 23 while the contact arm 24 is in contact with the point 50. The difference between the two voltages becomes the input voltage of the amplifier 35, the latter producing sufficient power to cause by means of the coil 31 a rotational motion of the motor 25 for such a distance and in such direction as to bring the contact arm 24 into that position either to the right or to the left of the zero point 50 of the resistance element 23 in which the voltage set up between the point 50 of the resistance element 23 and the newly established contact point of the contact arm 24 with this resistance element is again equal and opposite to the output voltage of the differential transformer $T_1$. Whether the motor 25 will turn the contact arm 24 towards the right or towards the left obviously depends on whether at any particular moment the secondary side of the differential transformer $T_1$ or the portion of the resistance element 23 that happens to be inserted into the above described testing circuit by the contact arm 24 supplies the predominating voltage. The two voltages are algebraically added in the testing circuit so as to take into account also the instantaneous polarity of these voltages, so that for given opposite winding directions of the coils 2, 3 a position of the armature 4 which is lower than the standard position will cause a movement of the contact arm 24 to a position to, say, the left of the zero point 50 of the resistance element 23, whereas a position of the armature 4 higher than the standard position will then cause the motor 25 to move the contact arm 24 to the right of the zero point 50.

The indication of the deviation of the position of the tip 6 of the feeler rod 5 from its predetermined standard position by means of the pointer 28 on the scale 29 takes place at an extremely magnified rate. Using a differential transformer of the kind described in the previously mentioned U. S. Patent No. 2,461,238 and a conventional 5-tube amplifier, I have found it easily possible to provide a travel of the pointer 28 of 2.25 inches for every one thousandth of an inch movement of the tip 6 of the feeler rod 5. Thus differences amounting to substantially less than a one ten thousandth of an inch in, for instance, the thickness of a diaphragm or an aneroid capsule can be exactly and readily read on the indicator scale 29.

When a next specimen 8 is placed under the tip 6 of the feeler rod 5 and the height of this next specimen happens to be different from the one previously tested, the position of said tip 6, and consequently the position of the armature 4, will differ from the position in the preceding test, thereby again causing an unbalance in one direction or the other between the output voltage of the differential transformer $T_1$ and the output voltage of the variable resistance element 23. This unbalance voltage will again excite the winding 31 to turn the motor 25 in the proper direction to move the contact arm 24 into such position in which the voltage set up in the portion of the resistance element 23 between the point 50 thereof and the new contact point of the arm 24 with said resistance element balances the output voltage of the differential transformer $T_1$.

In testing the height or the thickness of diaphragms or thin-walled capsules, such as aneroid capsules, it is a distanct advantage of the hereinbefore described device that the feeler rod 5 carried by the armature 4 does not preload the diaphragm or capsule with a restraining force. Therefore, tests made with the device, e. g. tests as to motion versus temperature characteristics of aneroid capsules, result in very accurate, unbiased measurements.

As has been mentioned before, the primary coil 1 of the differential transformer $T_1$ and the variable impedance element 23 are connected in parallel to each other to the secondary winding 10 of the transformer $T_2$. Due to this arrangement the differential transformer $T_1$ and the impedance element 23 receive their primary operating voltage from the same source and any change in this source due to line fluctuations or thermal resistance changes will affect both said devices to the same degree without influencing the null balance.

In the preceding description reference has been made to the phase angle correction network 46, 47 which makes it possible to bring into balance voltages established in electrical circuit elements which, in themselves, are of different phase angle characteristics. No other correcting elements have been indicated in the circuit shown but it will be obvious to electrical engineers as well as to electronics engineers that correcting elements, such as compensating or filtering elements and networks, may be inserted at various points of the circuit shown for generally known purposes, such as for the purpose of filtering out parasitic voltages or undesired harmonics, or for the purpose of timing the motor to the line frequency, etc. Since correcting devices of this kind are not only well known but also of no direct bearing on the basic operation of the present invention, their illustration in the drawing and description in the specification is deemed superfluous.

While I have described and illustrated one particular device embodying my invention, 1 desire it to be understood that this particular embodiment has been presented by way of example only and that various modifications and rearrangements of the details shown in the drawing may be made without departure from the present invention or from the scope of the appended claim.

What I claim is:

In an electrical displacement measuring device, a source of alternating current, a differential transformer having a primary coil, oppositely wound secondary coils connected in series and arranged symmetrically with respect to said primary coil and an armature axially movable from a neutral position in both directions, a testing circuit including both said secondary coils in series and an electronic amplifier having its input end connected to the output end of said differential transformer, a variable resistor having two end points and a mid point, the latter dividing the resistance of said resistor into two symmetrical halves, an output end of said amplifier being connected to said mid point of said resistor, a contact arm movable along said variable resistor for inserting into said testing circuit a portion of one or the other of said two halves of the resistance of said variable resistor, correcting means for shifting the phase of the voltage through said resistor into phase with the voltage set up in said secondary coils, a reversible motor for moving said contact arm over said variable resistor, said motor comprising a rotor and means connected to said amplifier for generating a field for turning said rotor in one direction or the other under the effect of a voltage proportional to the algebric sum of the output voltage of said differential transformer and the voltage across the portion of the one half of the resistance of said variable resistor inserted into said measuring circuit by said contact arm, for moving said contact arm over said resistor so as to cause said last named voltage to become equal and opposite to said voltage resulting in said secondary coils, a transformer having a primary winding and a secondary winding, said secondary winding supplying power from said source of alternating current in parallel to the primary coil of said differential transformer and to said variable resistor as a whole, and indicating means coupled with said operating means for movement therewith.

References Cited in the file of this patent

UNITED STATES PATENTS

| | | |
|---|---|---|
| 2,016,978 | Thomas | Oct. 8, 1935 |
| 2,219,282 | Harder et al. | Oct. 29, 1940 |
| 2,334,543 | Connelly | Nov. 16, 1943 |
| 2,360,121 | Garvin | Oct. 10, 1944 |
| 2,362,661 | Peters et al. | Nov. 14, 1944 |
| 2,380,251 | Ludbrook | July 10, 1945 |
| 2,408,524 | Mestas | Oct. 1, 1946 |
| 2,420,539 | Hornfeck | May 13, 1947 |
| 2,452,862 | Neff | Nov. 2, 1948 |
| 2,457,558 | Hornfeck | Dec. 28, 1948 |
| 2,503,851 | Snow | Apr. 11, 1950 |
| 2,509,986 | Neff | May 30, 1950 |